(12) United States Patent
Shi (10) Patent No.: US 12,481,193 B2
(45) Date of Patent: Nov. 25, 2025

(54) METHOD FOR CONTROLLING ELECTROCHROMIC GLASS, AND ELECTROCHROMIC GLASS

(71) Applicant: SHENZHEN GUANGYI TECH CO., LTD., Guangdong (CN)

(72) Inventor: Zhirui Shi, Guangdong (CN)

(73) Assignee: SHENZHEN GUANGYI TECH CO., LTD., Guangdong (CN)

( * ) Notice: Subject to any disclaimer, the term of this patent is extended or adjusted under 35 U.S.C. 154(b) by 477 days.

(21) Appl. No.: 17/998,153

(22) PCT Filed: Apr. 28, 2021

(86) PCT No.: PCT/CN2021/090508
§ 371 (c)(1),
(2) Date: Nov. 7, 2022

(87) PCT Pub. No.: WO2021/223636
PCT Pub. Date: Nov. 11, 2021

(65) Prior Publication Data
US 2023/0221610 A1    Jul. 13, 2023

(30) Foreign Application Priority Data

May 8, 2020  (CN) .................. 202010383716.X (51) Int. Cl.
*G02F 1/163* (2006.01)
*G02F 1/157* (2006.01)

(52) U.S. Cl.
CPC .............. *G02F 1/163* (2013.01); *G02F 1/157* (2013.01)

(58) Field of Classification Search
CPC ...... G02F 1/163; G02F 1/157; G02F 2201/58; E06B 2009/2464; E06B 3/6722; E06B 9/24

See application file for complete search history.

(56) References Cited

U.S. PATENT DOCUMENTS

2006/0158715 A1  7/2006 Furusawa et al.
2013/0161971 A1  6/2013 Bugno et al.
(Continued)

FOREIGN PATENT DOCUMENTS

CN    203573065 U    4/2014
CN    105050297 A    11/2015
(Continued)

OTHER PUBLICATIONS

International Search Report of International Application No. PCT/CN2021/090508 dated Jun. 8, 2021 issued by the China National Intellectual Property Administration (ISA/CN).
(Continued)

*Primary Examiner* — Tuyen Tra
(74) *Attorney, Agent, or Firm* — TechLaw Ventures, PLLC; Terrence J. Edwards (57) ABSTRACT

A method for controlling an electrochromic glass and an electrochromic glass. The electrochromic glass includes a second sensor, a processor module and an electrochromic layer. The second sensor is configured to convert an optical signal to an electrical signal and send the electrical signal to the processor module (13). The second sensor is disposed on a side of the electrochromic layer facing away from the incidence of ambient light, and a light-sensing surface of the second sensor faces in a direction toward the incidence of the ambient light. The method includes: generating an adjustment instruction based on a second illuminance of ambient light passing through an electrochromic layer, where the adjustment instruction carries a control signal; and transmitting the adjustment instruction to the electrochromic layer so that transmittance of the electrochromic layer is adjusted according to the control signal, thus controlling transmittance of electrochromic glass.

20 Claims, 7 Drawing Sheets

(56) References Cited

U.S. PATENT DOCUMENTS

| | | | |
|---|---|---|---|
| 2014/0236323 A1* | 8/2014 | Brown | G02F 1/163 |
| | | | 700/90 |
| 2019/0171081 A1 | 6/2019 | Zedlitz et al. | |
| 2019/0263317 A1 | 8/2019 | Chen et al. | |
| 2020/0019034 A1 | 1/2020 | Lagowski et al. | |

FOREIGN PATENT DOCUMENTS

| | | |
|---|---|---|
| CN | 205720867 U | 11/2016 |
| CN | 106200187 A | 12/2016 |
| CN | 106773439 A | 4/2017 |
| CN | 107089182 A | 8/2017 |
| CN | 110109256 A | 8/2019 |
| CN | 110476485 A | 11/2019 |
| CN | 110573939 A | 12/2019 |
| CN | 110646951 A | 1/2020 |
| CN | 110908209 A | 3/2020 |
| CN | 110992840 A | 4/2020 |
| CN | 111474797 A | 7/2020 |
| JP | H01168520 A | 7/1989 |
| JP | 2009294183 A | 12/2009 |
| JP | 2018010084 A | 1/2018 |

OTHER PUBLICATIONS

Office Action issued by the State Intellectual Property Office of People's Republic of China in Application No. 202010383716.X, dated Apr. 2, 2021.
Office Action issued by the State Intellectual Property Office of People's Republic of China in Application No. 202010383716.X, dated Apr. 2, 2021 (English Translation).
Office Action issued by the State Intellectual Property Office of People's Republic of China in Application No. 202010383716.X, dated Jun. 29, 2021.
Office Action issued by the State Intellectual Property Office of People's Republic of China in Application No. 202010383716.X, dated Jun. 29, 2021 (English Translation).
English Translation of Publication No. CN105050297A prepared by Google Patents on Nov. 7, 2022.
English Translation of Publication No. CN106200187A prepared by Google Patents on Nov. 7, 2022.
English Translation of Publication No. CN107089182A prepared by Google Patents on Nov. 7, 2022.
English Translation of Publication No. CN110109256A prepared by Google Patents on Nov. 7, 2022.
English Translation of Publication No. CN110476485A prepared by Google Patents on Nov. 7, 2022.
English Translation of Publication No. CN110573939A prepared by Google Patents on Nov. 7, 2022.
English Translation of Publication No. CN110646951A prepared by Google Patents on Nov. 7, 2022.
English Translation of Publication No. CN110908209A prepared by Google Patents on Nov. 7, 2022.
English Translation of Publication No. CN110992840A prepared by Google Patents on Nov. 7, 2022.
English Translation of Publication No. CN111474797A prepared by Google Patents on Nov. 7, 2022.
English Translation of Publication No. CN203573065U prepared by Google Patents on Nov. 7, 2022.
English Translation of Publication No. CN205720867U prepared by Google Patents on Nov. 7, 2022.
English Translation of Publication No. JP2009294183A prepared by Google Patents on Nov. 7, 2022.
English Translation of Publication No. JP2018010084A prepared by Google Patents on Nov. 7, 2022.
English Translation of Publication No. JPH01168520A prepared by Google Patents on Nov. 7, 2022.
English Translation of CN 105050297, prepared by Google Patents (https://patents.google.com/patent/CN105050297A/en?oq=CN+105050297).
English Translation of CN 106200187, prepared by Google Patents (https://patents.google.com/patent/CN106200187B/en?oq=CN+106200187).
English Translation of CN 106773439, prepared by Google Patents (https://patents.google.com/patent/CN106773439B/en?oq=CN+106773439).
English Translation of CN 203573065, prepared by Google Patents (https://patents.google.com/patent/CN203573065U/en?oq=CN+203573065).

* cited by examiner

METHOD FOR CONTROLLING ELECTROCHROMIC GLASS, AND ELECTROCHROMIC GLASS

CROSS-REFERENCE TO RELATED APPLICATION

This is a National stage application, filed under 35 U.S.C. 371, of International Patent Application No. PCT/CN2021/090508, filed on Apr. 28, 2021, which is based on and claims priority to Chinese Patent Application No. 202010383716.X filed with the China National Intellectual Property Administration (CNIPA) on May 8, 2020, the disclosure of which is incorporated herein by reference in its entirety.

TECHNICAL FIELD

Embodiments of the present disclosure relate to the technical field of chromatism devices, for example, a method for controlling an electrochromic glass and an electrochromic glass.

BACKGROUND

An electrochromic material is used in electrochromic glass buildings. The electrochromic material can undergo a stable and reversible oxidation-reduction reaction under the action of an applied electric field so that optical properties (transmittance, reflectance and absorptance) of the material change. An application of electrochromic glass can achieve a series of effects such as controllable chromatism, building energy conservation and glare blocking. An application of the electrochromic glass in buildings (specially in commercial buildings), aerospace and automobile manufacturing is steadily increased.

Generally, a photosensor is mounted on an outer wall of a building so that a solar luminous intensity is detected by the photosensor and transmittance of the electrochromic glass is adjusted according to the solar luminous intensity, thereby softening indoor tight.

However, in the related art, methods for adjusting the transmittance of electrochromic glass have many disadvantages in practical use.

SUMMARY

The present disclosure provides a method for controlling an electrochromic, glass and an electrochromic glass, so as to achieve that a transmittance of the electrochromic glass is accurately controlled so that an adjustment result reaches an expected target as much as possible.

In a first aspect, embodiments of the present disclosure provide a method for controlling an electrochromic glass, where the electrochromic glass includes an electrochromic layer and a processor module. The method for controlling an electrochromic glass is performed by the processor module and includes the steps described below.

An adjustment instruction is generated based on a second illuminance of ambient light passing through the electrochromic layer, where the adjustment instruction carries a control signal.

The adjustment instruction is transmitted to the electrochromic layer so that transmittance of the electrochromic layer is adjusted according to the control signal.

In a second aspect, embodiments of the present disclosure further provide electrochromic glass. The electrochromic glass includes a second sensor, a processor module and an electrochromic layer.

The second sensor is configured to convert an optical signal to an electrical signal and send the electrical signal to the processor module.

The second sensor is disposed on a side of the electrochromic layer facing away from the incidence of ambient light, and a light-sensing surface of the second sensor faces in a direction toward the incidence of the ambient light.

The processor module is configured to implement the method for controlling an electrochromic glass according to the embodiments of the first aspect of the present disclosure.

DETAILED DESCRIPTION

In the related art, a method for adjusting a transmittance of an electrochromic glass has many deficiencies in practical use. The transmittance of the electrochromic glass often cannot be accurately adjusted to a transmittance most suitable for a user and requires to be further manually adjusted by the user, resulting in poor usage experience.

The present disclosure is described below in conjunction with drawings and embodiments.

Embodiments of the present disclosure provide a method for controlling an electrochromic glass, where the electrochromic glass includes an electrochromic layer. The method for controlling the electrochromic glass includes the steps described below.

An adjustment instruction is generated based on a second illuminance of ambient light passing through the electrochromic layer, where the adjustment instruction carries a control signal.

The adjustment instruction is transmitted to the electrochromic layer to adjust a transmittance of the electrochromic layer according to the control signal.

In an embodiment, the following step is further included.

The adjustment instruction is generated based on a first illuminance and the second illuminance, where the first illuminance is an illuminance of the ambient light not entering the electrochromic layer.

In an embodiment, the adjustment instruction being generated based on the first illuminance and the second illuminance includes the steps described below.

A first transmittance to which the transmittance of the electrochromic layer is to be adjusted is determined according to the first illuminance.

Whether the transmittance of the electrochromic layer is adjusted to the first transmittance s determined.

If the transmittance of the electrochromic layer is adjusted to the first transmittance, a second illuminance signal is received from a second sensor configured to detect the second illuminance.

Whether the second illuminance is within a preset range is determined.

If the second illuminance is outside of the preset range, the adjustment instruction is generated, where the adjustment instruction carries a first control signal; when the second illuminance is greater than a maximum value of the preset range, the first control signal is configured to reduce the transmittance of the electrochromic layer; and when the second illuminance is less than a minimum value of the preset range, the first control signal is to improve the transmittance of the electrochromic layer.

In an embodiment, the adjustment instruction being generated based on the first illuminance and the second illuminance includes the steps described below.

A second transmittance to which the transmittance of the electrochromic layer is to be adjusted is determined according to the second illuminance detected by a second sensor.

Whether the second transmittance is lower than a preset transmittance is determined.

If the second transmittance is lower than the preset transmittance, a first illuminance signal is received from a first sensor configured to detect the first illuminance.

Whether the first illuminance is less than a minimum value of a preset range is determined.

If the first illuminance is less than the minimum value of the preset range, the adjustment instruction is generated, where the adjustment instruction carries a second control signal configured to improve the transmittance of the electrochromic layer.

The adjustment instruction is generated, where the adjustment instruction carries a second control signal configured to improve the transmittance of the electrochromic layer.

In an embodiment, the adjustment instruction being generated based on the second illuminance of the ambient light passing through the electrochromic layer further includes the steps described below.

A third transmittance to which the transmittance of the electrochromic layer is to be adjusted is determined according to the second illuminance.

The adjustment instruction is generated, where the adjustment instruction carries a third control signal configured to adjust the transmittance of the electrochromic layer to the third transmittance.

In an embodiment, before generating the adjustment instruction based on the second illuminance of the ambient light passing through the electrochromic layer further includes the steps described below.

Whether a working time period corresponding to a current time is a preset working tune period is determined.

If the working time period corresponding to the current time is the preset working time period, the adjustment instruction is generated based on the second illuminance of the ambient tight passing through the electrochromic layer; and if the working time period corresponding to the current time is outside of the preset working time period, an adjustment instruction for adjusting the transmittance of the electrochromic layer to a specified transmittance is generated.

In an embodiment, the electrochromic layer includes at least one electrochromic cell whose transmittance is capable of being separately adjusted, and the adjustment instruction further carries a dimming sequence signal and is configured to control the transmittance of the at least one electrochromic cell to be sequentially adjusted according to the dimming sequence signal.

Embodiment One

Figure 1:
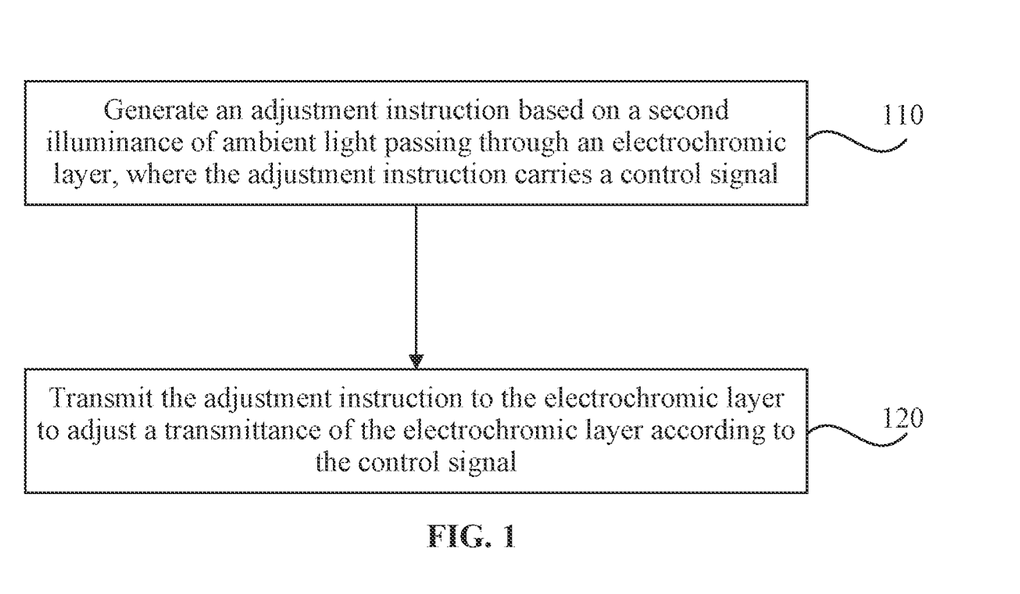
FIG. 1 is a flowchart of a method for controlling an electrochromic glass according to embodiment one of the present disclosure.

FIG. 1 is a flowchart of a method for controlling an electrochromic glass according to embodiment one of the present disclosure. The present embodiment can be applicable to the case where the transmittance of the electrochromic glass is automatically adjusted. The method can be performed by a processor module of the electrochromic glass, where the processor module is integrated as a component of the electrochromic glass into a structure of the electrochromic glass. The method includes the steps described below.

In step 110, an adjustment instruction is generated based on a second illuminance of ambient tight passing through an electrochromic layer, where the adjustment instruction carries a control signal.

Electrochromic glass has been commonly used in buildings, vehicles and other fields. In the present disclosure, the electrochromic glass includes an electrochromic layer. Taking the electrochromic layer as a boundary, the space inside a building or a vehicle is regarded as an interior space, and the space outside the building or the vehicle is regarded as an ambient space. The above ambient light is light from the ambient space, such as sunlight or direct light. Exemplarily, the basic structure of the electrochromic glass is composed of a glass substrate, an intermediate film of laminated glass, an electrochromic layer, an intermediate film of laminated glass and a glass substrate. The electrochromic layer, which is a core of the entire electrochromic glass, is a layer where a chromatism reaction occurs. The phenomenon of stable and reversible change in the optical properties (such as reflectance, transmittance and absorptance) of the electrochromic layer under the action of an applied voltage is manifested as a reversible change in the color and transparency of the electrochromic glass in appearance. When the illuminance of the ambient light is changed, the transmittance of the electrochromic layer is adjusted (for example, when the illuminance of the ambient light is enhanced, the transmittance of the electrochromic layer is adjusted to be lower; and when the illuminance of the ambient light is reduced, the transmittance of the electrochromic layer is adjusted to be higher) so that light in the interior space can be maintained to be soft. Therefore, an accurate response to the change in the illuminance of the ambient light is particularly important. In the present embodiment, a second sensor is disposed on a side of the electrochromic layer facing the interior space so that the second illuminance of the ambient light passing through the electrochromic layer is detected, and when the illuminance detection is performed, a light-sensing surface of the second sensor faces in a direction toward the incidence of the ambient light. On the one hand, what is detected is a luminous intensity of light actually incident into the indoor environment, which reflects a more real feeling of a user. On the other hand, the above second sensor is disposed in the interior space, and thus is not easily affected by an uncontrollable external environmental factor, thereby significantly improving the detection accuracy and stability. The processor module generates the adjustment instruction based on the second illuminance, where the adjustment instruction carries the control signal. A voltage applied to the electrochromic layer is controlled by the control signal, where the electrochromic layer may be a flexible or rigid sheet layer with adjustable transmittance and made of one layer of material or a combination of multiple layers of materials, including types such as polymer dispersed liquid crystal (PDLC) glass, a suspended particle device (SPD) and electrochromic (EC) glass. In the embodiment of the present disclosure, the side of the electrochromic layer facing the interior space is a side of the electrochromic layer facing away from the incidence of the ambient fight.

EC glass having a particular structure is used as an example for describing a process of adjusting the transmittance of the electrochromic layer by the control signal. The electrochromic layer includes a first conductive substrate layer, an electrochromic material layer, an electrolyte layer, an ion storage layer and a second conductive substrate layer, where the electrochromic material layer is changed under the action of a voltage so that a color of the electrochromic material layer is changed, the electrolyte layer provides a transmission channel of ions between the electrochromic material layers, and the ion storage layer functions to store ions and balance charges. When a reverse voltage is applied, ions in the electrochromic material layer return to the ion storage layer, and the color of the electrochromic layer is restored.

In step 120, the adjustment instruction is transmitted to the electrochromic layer so that a transmittance of the electrochromic layer is adjusted according to the control signal.

An automatic adjustment mechanism of the transmittance of the electrochromic glass is as follows: a preset value of illuminance is set, the detected illuminance is compared with the preset value of illuminance, and the transmittance of the electrochromic glass is adjusted according to a preset automatic adjustment rule. A preset range corresponding to the preset value of illuminance may be set according to a specific usage scenario. For example, in an office scenario, the preset range may be set to 400 to 600 lux, and in a library scenario, the preset range may be set to 200 to 400 lux. In some particular usage scenarios, the above preset range may also be set to a single point value. Exemplarily, the above preset automatic adjustment rule is as follows: whether the second illuminance is within the preset range is determined. When the detected second illuminance is greater than a maximum value of the preset range, the second illuminance of light entering the interior space through the electrochromic layer is greater than an expected target, indicating that the current transmittance of the electrochromic layer is too high. In this case, the processor module generates a corresponding feedback control signal to control the electrochromic layer to reduce the transmittance. If the detected second illuminance is less than a minimum value of the preset range, the second illuminance of light entering the interior space through the electrochromic layer is less than an expected target, indicating that the transmittance of the current electrochromic layer is too low. In this case, the processor module generates a corresponding feedback control signal to control the electrochromic layer to improve the transmittance so that the illuminance of light passing through the electrochromic glass reaches the expected target of softening indoor light. If the detected second illuminance is within the preset range, the transmittance of the electrochromic layer meets the requirement, and no feedback adjustment is required.

The electrochromic layer may be a flexible or rigid sheet layer with adjustable transmittance and made of one layer of material or a combination of multiple layers of materials, such as PDLC glass, an SPD and EC glass. In the present embodiment, when the illuminance of the ambient light is relatively high, reducing the transmittance of the electrochromic layer is conducive to preventing strong glare from affecting the user; when the illuminance of the ambient light is relatively low, improving the transmittance of the electrochromic layer is conducive to the use of light in the ambient space for lighting to a certain extent, thereby reducing the energy consumption of an illumination system of the interior space. Moreover, the electrochromic layer can block part of infrared, reduce heat dissipation from the interior space and reduce heat entry from the external ambient space, effectively reducing the energy consumption of an air conditioning system.

In the technical solution of the present embodiment, the second illuminance of the ambient light entering the interior space through the electrochromic layer is acquired, the second illuminance is compared with the preset value of illuminance to obtain the corresponding feedback control signal, the transmittance of the electrochromic layer currently suitable for the interior space is determined according to the feedback of the second illuminance, and the feedback adjustment is performed on the electrochromic layer, so that the transmittance of the electrochromic glass is accurately adjusted.

Embodiment Two

Figure 2:
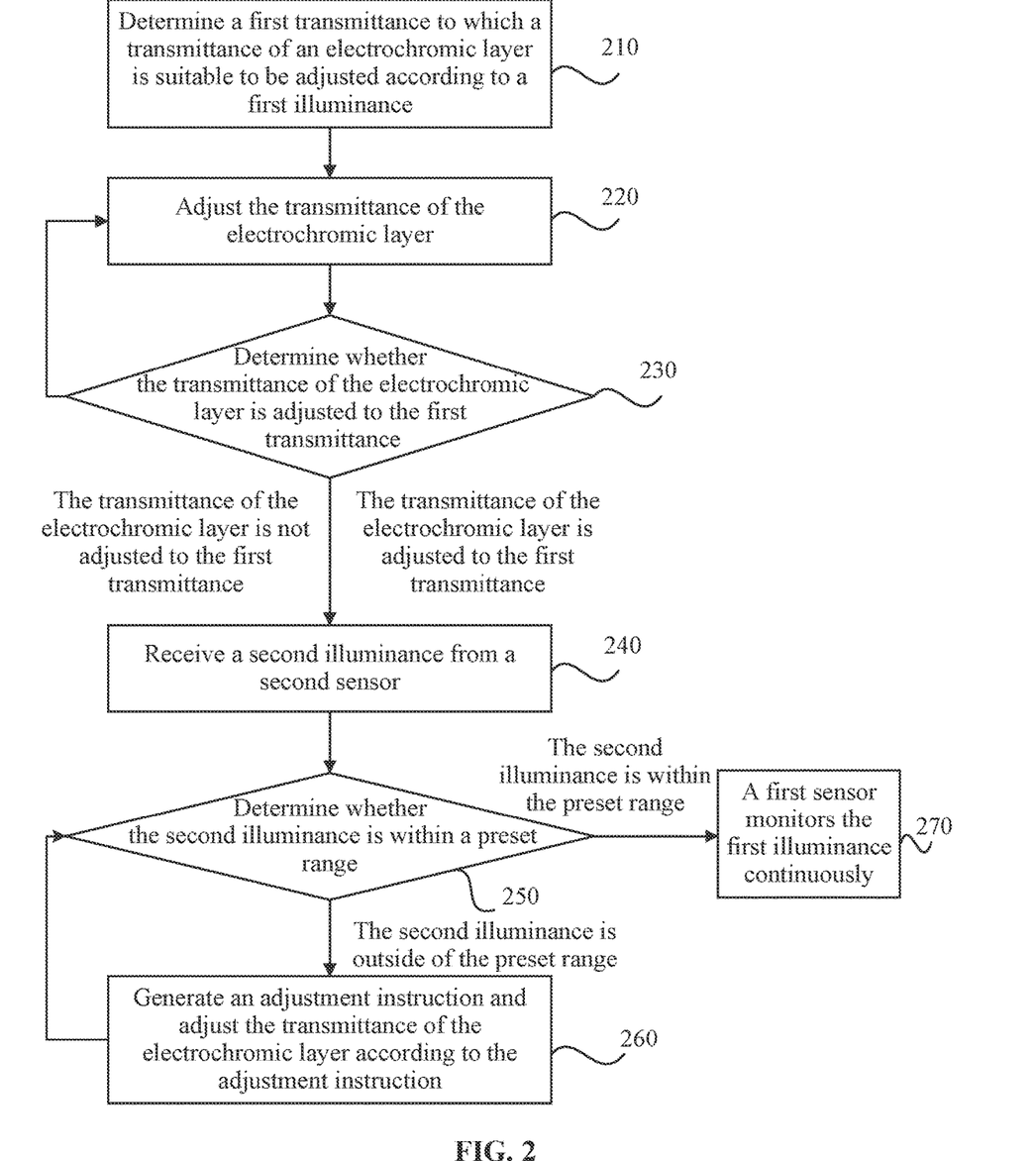
FIG. 2 is a flowchart of a method for controlling an electrochromic glass according to embodiment two of the present disclosure.

FIG. 2 is a flowchart of a method for controlling an electrochromic glass according to embodiment two of the present disclosure. As shown in FIG. 2, specific steps are described below.

In step 210, a first transmittance to which a transmittance of an electrochromic layer is to be adjusted is determined according to first illuminance.

In the embodiment of the present disclosure, a first sensor is disposed on a side of the electrochromic layer facing the ambient space, and a light-sensing surface faces a light incident side of ambient light. The first illuminance is an illuminance of the above ambient light not entering the electrochromic layer and is detected by the first sensor. The first transmittance to which the transmittance of the electrochromic layer is suitable to be adjusted is determined according to the first illuminance. Exemplarily, if the first illuminance exceeds a maximum value of a preset interval, it is indicated that outdoor light is relatively strong. To avoid too strong intensity of light entering an interior space through the electrochromic layer, it is necessary to adjust the transmittance of the electrochromic layer to be lower. If the first illuminance is less than a minimum value of the preset interval, it is indicated that outdoor light is relatively dark and it is necessary to adjust the transmittance of the electrochromic layer to be higher. A correspondence relationship between the illuminance and the transmittance of electrochromic layer is pre-stored in a processor module, and the processor module can determine a value of the first transmittance matched with the detected first illuminance. In the embodiment of the present disclosure, the side of the electrochromic layer facing the ambient space is a side of the electrochromic layer facing the incidence of the ambient light.

In step 220, the transmittance of the electrochromic layer is adjusted.

The processor module adjusts the transmittance of the electrochromic layer according to the above first transmittance and generates an adjustment completion signal after completing the adjustment.

In step 230, whether the transmittance of the electrochromic layer is adjusted to the first transmittance is determined if the transmittance of the electrochromic layer is adjusted to the first transmittance, step 240 is performed; and if the transmittance of the electrochromic layer is not adjusted to the first transmittance, the method returns to step 220.

After receiving an adjustment completion signal, the processor module detects a current transmittance of the electrochromic layer and determines whether the transmittance of the electrochromic layer is adjusted to the first transmittance. If the transmittance of the electrochromic layer is adjusted to the first transmittance, the method goes to step 240. If the transmittance of the electrochromic layer is not adjusted to the first transmittance, the adjustment is continued until the transmittance of the electrochromic layer reaches the first transmittance.

In step 240, a second illuminance is received from a second sensor.

The second illuminance is received front the second sensor, so as to determine a luminance of the ambient light entering the interior space through the electrochromic layer after the transmittance of the electrochromic layer is adjusted to the first transmittance. In the present embodiment, the second sensor may be kept in a continuous on state or may be awakened in, before or after any one of the steps before step 240. As a preferred embodiment, after it is determined that the transmittance of the electrochromic layer has been adjusted to the first transmittance, the second sensor is awakened.

In step 250, whether the second illuminance is within a preset range is determined; if the second illuminance is outside of the preset range, step 260 is performed; if the second illuminance is within the preset range, step 270 is performed.

Whether the second illuminance is within the preset range is determined, where the preset range is an illuminance range preset in the processor module, for example, an illuminance range that makes a person feel comfortable. When the second illuminance is outside of the preset range, it is indicated that further feedback adjustment requires to be performed on the illuminance of the electrochromic layer, that is, the first transmittance of the electrochromic layer adjusted according to the first illuminance is not suitable for the current indoor illuminance requirement, and further feedback adjustment requires to be performed according to the second illuminance. When the second illuminance is within the preset range, it is indicated that the adjusted transmittance of the electrochromic layer meets the requirement and no feedback adjustment is required. Generally, when the illuminance of the ambient light is in the vicinity of a boundary value of the preset interval corresponding to the first illuminance, the first illuminance detected by the first sensor is sometimes within the preset interval or sometimes outside of the preset interval. In this case, if the transmittance of the electrochromic layer is adjusted only according to the first illuminance, the transmittance of the electrochromic glass is continuously switched. Alternatively, due to a detection error of the first sensor, although the first illuminance is actually within/outside of the preset interval, the detection result shows the first illuminance is outside of/within the preset interval. In this case, the adjustment of the transmittance of the electrochromic layer adjusted only according to the first illuminance will cause a deviation. Therefore, the further feedback adjustment requires to be performed according to the second illuminance so that the adjustment accuracy of the transmittance of the electrochromic layer is improved, thereby achieving the expected target as much as possible and meeting a real requirement of a user.

In step 260, an adjustment instruction is generated, and the transmittance of the electrochromic layer is adjusted according to the adjustment instruction.

When the second illuminance is not within the preset range, two cases are included: when the second illuminance is greater than a maximum value of the preset range, for example, the intensity of light entering the interior space through the electrochromic layer is greater than a maximum light intensity allowing human comfort, it is necessary to adjust the transmittance of the electrochromic layer to be lower to reduce the intensity of light entering the interior space is reduced, and a first control signal carried in the adjustment instruction generated by the processor module is configured to reduce the transmittance of the electrochromic layer; and when the second illuminance is less than a minimum value of the preset range, for example, the intensity of light entering the interior space through the electrochromic layer is less than a minimum light intensity allowing human comfort, it is necessary to adjust the transmittance of the electrochromic layer to be higher to improve the intensity of light entering the interior space, and a first control signal carried in the adjustment instruction generated by the processor module is configured to improve the transmittance of the electrochromic layer.

The transmittance of the electrochromic layer is adjusted according to the control signal in the generated adjustment instruction so that the illuminance of tight passing through the electrochromic layer reaches the expected target of softening indoor light.

In addition, the control signal mentioned in embodiment one includes the first control signal mentioned in embodiment two and further includes a second control signal and a third control signal mentioned below.

In step 270, the first illuminance is continuously monitored by the first sensor.

When the second illuminance is within the preset range, it is indicated that the adjusted first transmittance of the electrochromic layer meets the requirement and no feedback adjustment is required. Therefore, the first sensor continues to monitor the first illuminance, waits for the next adjustment. Then, when the first illuminance is not within the preset interval, the transmittance of the electrochromic layer is adjusted according to the first transmittance corresponding to the first illuminance again. In this case, no feedback adjustment is required. The second sensor may be kept in the continuous on state or may be put into a sleep state to reduce the energy consumption.

Embodiment Three

Figure 3:
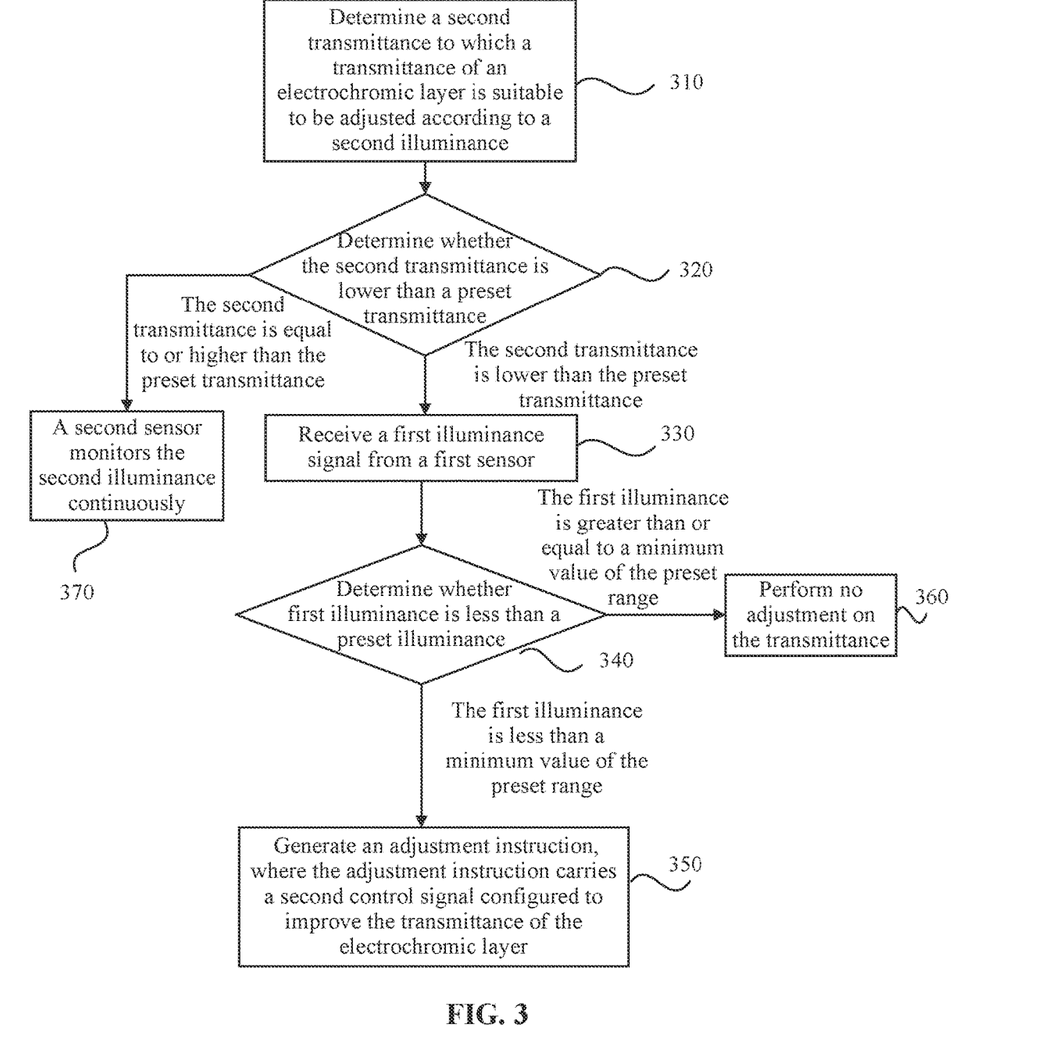
FIG. 3 is a flowchart of a method for controlling an electrochromic glass according to embodiment three of the present disclosure.

FIG. 3 is a flowchart of a method for controlling an electrochromic glass ac cording to embodiment three of the present disclosure. As shown in FIG. 3, specific steps are described below.

In step 310, a second transmittance to which a transmittance of an electrochromic layer is to be adjusted is determined according to a second illuminance.

In the embodiment of the present disclosure, a related determination of the second illuminance is a condition for triggering an adjustment process, and a related determination of a first illuminance is a condition for feedback adjustment. The second illuminance is detected by a second sensor, and the second transmittance to which the transmittance of the electrochromic layer is suitable to be adjusted is determined according to the second illuminance detected by the second sensor. The second sensor is disposed on a side of the electrochromic layer facing the interior space, and a light-sensing surface faces a light incident side of ambient light. Exemplarily, when the second illuminance exceeds a maximum value of a preset range, it is indicated that the intensity of light entering the interior space through the electrochromic layer is too strong, and in this case, the visible light transmittance of the electrochromic layer is adjusted to be lower; and when the second illuminance is less than a minimum value of the preset range, it is indicated that the intensity of light entering the interior space through the electrochromic layer is relatively weak and the visible light transmittance of the electrochromic layer is adjusted to be higher. Exemplarity, the electrochromic glass includes an outer glass, an electrochromic layer and an inner glass, and the second sensor may be disposed on the electrochromic layer of the electrochromic glass on a side facing the inner glass, between the electrochromic layer and the inner glass, on the inner glass or on any required position in the interior space, for example, on an office desk. A photosensitive optical path of the second sensor is adjusted to collect light irradiated to the office desk through the electrochromic glass and determine whether the light entering the room reaches an expectation target. When the second illuminance is greater than a preset value of illuminance, the indoor light is too strong, which affects the work comfort of the user. The position of the second sensor may be fixed or movable, and the second sensor may be connected to a processor module via a line or may be wirelessly connected to the processor module for signal transmission.

In step 320, whether the second transmittance is lower than a preset transmittance is determined; if the second transmittance is lower than the preset transmittance, step 330 is performed; and if the second transmittance is equal to or higher than the preset transmittance, step 370 is performed.

The above preset transmittance is generally low. When the second transmittance is lower than the preset transmittance, even if the illuminance of the ambient light is weakened, the amount of light passing through the electrochromic layer is changed very little. Therefore, it is difficult for the second sensor to sensitively detect the change in the illuminance of the ambient light in an external ambient space. Therefore, when the second transmittance is tower than the preset transmittance, it is difficult to trigger the adjustment of the transmittance of the electrochromic layer again only through the adjustment of the second sensor, in this case, whether the second transmittance is lower than the preset transmittance is determined; when the second transmittance is lower than the preset transmittance, step 330 is perforated; and when the second transmittance is not tower than the preset transmittance, step 370 is performed.

In step 330, a first illuminance signal is received from a first sensor.

When the second transmittance is lower than the preset transmittance, if the illuminance of the ambient light in the external ambient space is weakened, it is difficult for the second sensor to sensitively detect the change in the illuminance of the external ambient light. Therefore, the transmittance of the electrochromic layer requires to be adjusted in conjunction with the first illuminance. In the present embodiment, the first sensor may be kept in a continuous on state or may be awakened in, before or after any one of the steps before step 330. As a preferred embodiment, after it is determined that the second transmittance is lower than the preset transmittance, the first sensor is awakened.

In step 340, whether a first illuminance is less than a minimum value of a preset range is determined; if the first illuminance is less than the minimum value of the preset range, step 350 is performed; and if the first illuminance is greater than or equal to the minimum value of the preset range, step 360 is performed.

If the first illuminance is less than the minimum value of the preset range, a feedback adjustment requires to be performed on the transmittance of the electrochromic layer according to the first illuminance. This is because although the first illuminance of the ambient light in the ambient space is weakened, since the second transmittance of the electrochromic layer is very low, it is difficult for the second sensor to sensitively detect the change in the illuminance of the ambient light. In this case, the feedback adjustment requires to be performed depending on the first illuminance detected by the first sensor to trigger adjusting the transmittance of the electrochromic layer to be higher.

In step 350, an adjustment instruction is generated, where the adjustment instruction carries a second control signal configured to improve the transmittance of the electrochromic layer.

The adjustment instruction carries the second control signal configured to improve the transmittance of the electrochromic layer. Exemplarity, a specific method for improving the transmittance of the electrochromic layer may include: improving the transmittance step by step until the transmittance of the electrochromic layer matches the first illuminance; or directly determining a fourth transmittance to which the transmittance of the electrochromic layer is suitable to be adjusted according to the first illuminance and then directly adjusting the transmittance of the electrochromic layer to the fourth transmittance.

In step 360, no adjustment is performed on the transmittance.

If the first illuminance is not less than the minimum value of the preset range, that is, the first illuminance is greater than the maximum value of the preset range or is within the preset range, no feedback adjustment requires to be performed on the transmittance of the electrochromic layer according to the first illuminance.

In step 370, the second illuminance is continuously monitored by the second sensor.

In the case where the second transmittance is higher than or equal to the preset transmittance, when the illuminance of the ambient light changes, the second sensor can detect the change sensitively. In this case, a good adjustment effect can be achieved through only monitoring by the second sensor. After the adjustment of the transmittance of the electrochromic layer is completed, this adjustment ends. The second sensor monitors the second illuminance continuously and waits for the next adjustment. The first sensor may be kept in the continuous on state or may be put into a sleep state to reduce the energy consumption.

Embodiment Four

On the basis of the technical solution of the preceding embodiment, it is further included that the transmittance of the electrochromic layer is adjusted only according to the second illuminance. Specific steps are described below.

A third transmittance to which the transmittance of the electrochromic layer is suitable to be adjusted is determined according to the second illuminance of the ambient light passing through the electrochromic layer.

The adjustment instruction is generated, where the adjustment instruction carries a third control signal configured to adjust the transmittance of the electrochromic layer to the third transmittance.

In the present embodiment, in some usage scenarios, the principle of directly adjusting the transmittance of the electrochromic layer by the second illuminance detected by the second sensor is similar to that in the preceding embodiment, which are not repeated here. In the present embodiment, when the transmittance of the electrochromic layer is too low to trigger the active adjustment for a higher transmittance of the electrochromic glass, the transmittance of the electrochromic glass may be manually adjusted to be higher by a user.

Embodiment Five

Figure 4:
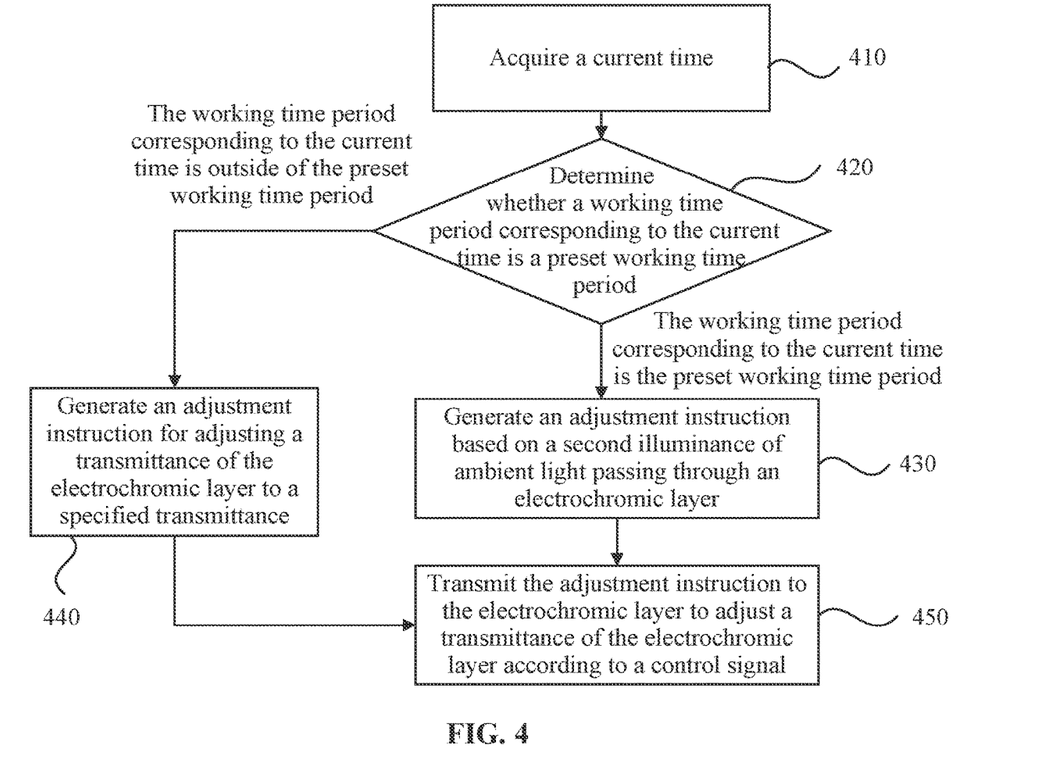
FIG. 4 is a flowchart of a method for controlling an electrochromic glass according to embodiment five of the present disclosure.

FIG. 4 is a flowchart of a method for controlling an electrochromic glass according to embodiment five of the present disclosure.

As shown in FIG. 4, specific steps are described below.

In step 410, a current time is acquired.

In step 420, whether a working time period corresponding to the current time is a preset working time period is determined; if the working time period corresponding to the current time is the preset working time period, step 430 is performed; and if the working time period corresponding to the current time is outside of the preset working time period, step 440 is performed.

According to a specific usage scenario, time of one day is divided into multiple working time periods, and different working time periods correspond to different control manners. The above preset working time period is a time period from sunrise to sunset. During the time period, a transmittance of the electrochromic layer requires to be adjusted according to ambient light, so as to meet a user's requirement for illuminance in the interior space. For example, at a particular location, the user's latitude, solar declination angle and current solar angle are provided so that a solar altitude angle at any local moment can be simulated by software, and the user's longitude and latitude, date and time zone information are provided so that local sunrise and sunset time can be simulated. Exemplarily, 0:00 to 6:00 is a late-night working time period, 6:00 to 12:00 is a sunrise working time period, 12:00 to 19:00 is a sunset working time period, 19:00 to 24:00 is a nighttime working time period, and corresponding preset working time periods are the sunrise working time period and the sunset working time period. In another example, 6:00 to 19:00 is a daytime working time period, 19:00 to 6:00 next day is a night working time period, and a corresponding preset working time period is the daytime working time period. The above divided time periods may be personalized according to a specific usage scenario, such as a season of a location and usage time of a building.

In step 430, an adjustment instruction is generated based on a second illuminance of ambient light passing through an electrochromic layer.

After it is determined that the current time belongs to the preset working time period, the adjustment instruction is generated based on the second illuminance of the ambient light passing through the electrochromic layer. For a specific step of generating the adjustment instruction, reference is made to the preceding embodiments one to four, which are not repeated here.

In step 440, an adjustment instruction for adjusting a transmittance of the electrochromic layer to a specified transmittance is generated.

After it is determined that the current time does not belong to the preset working time period, the adjustment instruction for the specified transmittance is generated according to a working time period where the current time is located. For example, when the current time is the nighttime working time period, the user does not want indoors to be seen by outdoors for most of the time and thus an adjustment instruction for controlling the transmittance of the electrochromic layer to be a minimum transmittance is generated, and if the user has a requirement such as viewing a night scene, the transmittance of the electrochromic glass may be manually adjusted to be the maximum transmittance; and when the current time is the late-night working time period, the electrochromic glass is not used in wee hours, and thus the electrochromic layer may be adjusted to the most stable state to extend a service life of the electrochromic layer. The electrochromic glass is a polar device, and is generally in the most stable state when in a short circuit state. Therefore, an adjustment instruction for adjusting the electrochromic layer to be in the short circuit state is generated, so as to extend the lifetime of the electrochromic device. The stable state differs according to different materials of the electrochromic layer. For example, for different materials, the stable state of the electrochromic layer may be a darkest state, a brightest state or an intermediate state of transmittance.

In step 450, the adjustment instruction is transmitted to the electrochromic layer to adjust the transmittance of the electrochromic layer according to a control signal.

The transmittance of the electrochromic layer is adjusted according to the control signal in the generated adjustment instruction.

The addition of the time control not only meets the user's requirements for the illuminance in the internal space in different time periods but also helps to save the energy consumption and extending the lifetime of the electrochromic device.

Embodiment Six

In each preceding embodiment, the electrochromic layer includes at least one electrochromic cell whose transmittance is capable of being separately adjusted, and the adjustment instruction further carries a dimming sequence signal, and the adjustment instruction is configured to control the transmittance of each of the at least one electrochromic cell to be sequentially adjusted according to the dimming sequence signal. When the electrochromic layer is one electrochromic cell whose transmittance is capable of being independently adjusted, the transmittance of the one electrochromic cell can be adjusted as a whole; and when the electrochromic layer is formed by splicing multiple electrochromic cells of small size, the transmittances of the multiple electrochromic cells can be adjusted in a partitioned manner, and the adjustment instruction carries the dimming sequence signal so that each electrochromic cell of the electrochromic layer sequentially changes in color. In a specific embodiment, when the working time period corresponding to the current time is the sunrise working time period, as time goes on, the sun slowly rises from a horizon, an angle of incidence of sunlight gradually increases, and a position irradiated by the light is moved upward from a lower end of the electrochromic glass. Exemplarily, when the electrochromic layer is formed by splicing multiple electrochromic cells, preferably, the electrochromic layer is formed by splicing multiple electrochromic cells in rows so that the transmittance adjustment is performed row by row. The positions of sensors are adjusted according to a requirement of a scenario. For example, a top of the electrochromic cell in each row may be provided with a sensor, and the transmittances of the electrochromic cells is controlled to be reduced in sequence from bottom to top according to the generated adjustment instruction.

In another specific embodiment, when the working time period corresponding to the current time is the sunset working time period, the outdoor light irradiated on the electrochromic glass is gradually weakened from top to bottom, and the transmittance adjustment of the electrochromic cells starts from an uppermost row. The transmittance adjustment of the electrochromic cells is logically consistent with that during the sunrise working time period and not repeated here.

When the electrochromic layer includes two or more electrochromic cells whose transmittances are capable of being separately adjusted, the transmittance of each electrochromic cell is adjusted according to the dimming sequence signal, and after each adjustment of the transmittance of one electrochromic cell, whether the second illuminance is within the preset range may be determined, if the second illuminance has been within the preset range, the subsequent adjustment is stopped; and if the second illuminance is not within the preset range, adjustment of the transmittance of the next electrochromic cell is continued. In a specific embodiment, the electrochromic layer includes multiple electrochromic cells, the second sensor is mounted at a certain indoor position (such as a conference table), the control signal is triggered by the second sensor, and the first sensor is in a feedback state. During the sunrise working time period, the adjustment of the transmittance of the electrochromic layer starts from the electrochromic cell in the lowermost layer. After the transmittance of the electrochromic cell in the lowermost layer is adjusted, if the second sensor detects that glare is blocked, the adjustment of the transmittance ends without adjusting the transmittance of other electrochromic cells; and if the second sensor can still detect glare, the transmittance of the electrochromic cell in a penultimate layer is sequentially adjusted.

The dimming sequence signal s added to the method for controlling an electrochromic glass and configured to control the respective electrochromic cells of the electrochromic layer to sequentially change in color. For example, different color-changing sequences are used for the sunrise working time period and the sunset working time period so that the adjustment of the indoor illuminance is more accurate, which is particularly suitable for a relatively open environment or a high floor not blocked by a building, such as an airport lounge, an airport control tower, a high-rise office building and residence.

In each preceding embodiment, manual adjustment may be further included. The user may perform personalized adjustment according to the requirement and configure a priority of the manual adjustment to be the highest. When the automatic adjustment and the manual adjustment simultaneously issue an adjustment instruction, the adjustment instruction of the manual adjustment is preferentially executed.

Embodiment Seven

Figure 5:
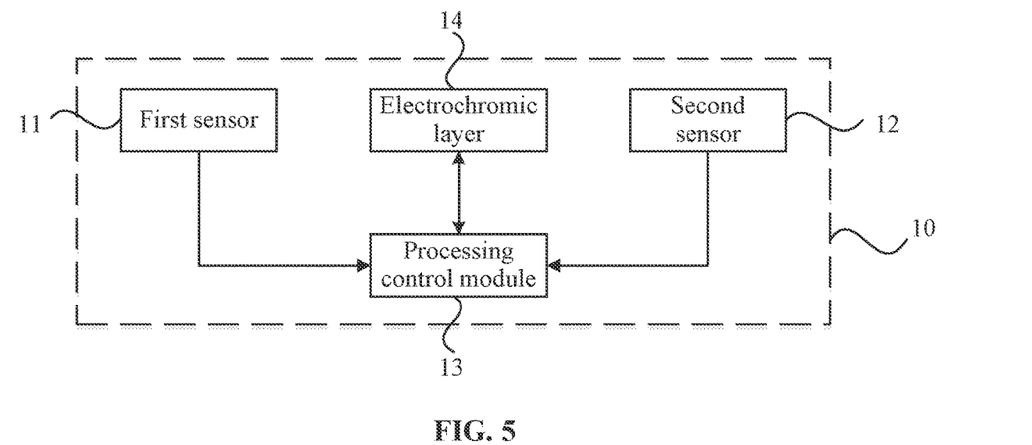
FIG. 5 is a block diagram illustrating a composition of an electrochromic glass according to embodiment seven of the present disclosure.

FIG. 5 is a block diagram illustrating a composition of an electrochromic glass according to embodiment seven of the present disclosure. As shown in FIG. 5, the electrochromic glass according to the embodiment of the present disclosure may perform the method for controlling the electrochromic glass according to any embodiment of the present disclosure and has function modules and beneficial effects corresponding to the performed method.

An electrochromic glass 10 includes a second sensor 12, a processor module 13 and an electrochromic layer 14.

The second sensor 12 is configured to convert an optical signal to an electrical signal and send the converted electrical signal to the processor module 13.

The second sensor 12 is disposed on a side of the electrochromic layer 14 facing away from the incidence of ambient light, and a light-sensing surface of the second sensor 12 faces a light incident side of the ambient light.

The processor module 13 is configured to generate an adjustment instruction based on a second illuminance of the ambient light passing through the electrochromic layer, where the adjustment instruction carries a control signal and the adjustment instruction is transmitted to the electrochromic layer 14 to adjust a transmittance of the electrochromic layer 14 according to the control signal.

In an embodiment, the processor module 13 adjusts a voltage applied to the electrochromic layer 14, and adjusts the transmittance of the electrochromic layer 14.

Optionally, the electrochromic glass 10 further includes a first sensor 11, where the first sensor 11 is configured to convert an optical signal to an electrical signal and send the converted electrical signal to the processor module 13; the first sensor 11 is disposed on a side of the electrochromic layer 14 facing the incidence of the ambient light, and a light-sensing surface of the first sensor 11 faces in a direction toward the incidence of the ambient light.

Figure 6:
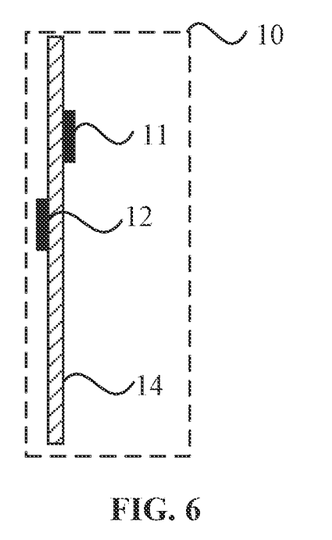
FIG. 6 is a structure diagram of an electrochromic glass according to embodiment seven of the present disclosure.
Figure 7:
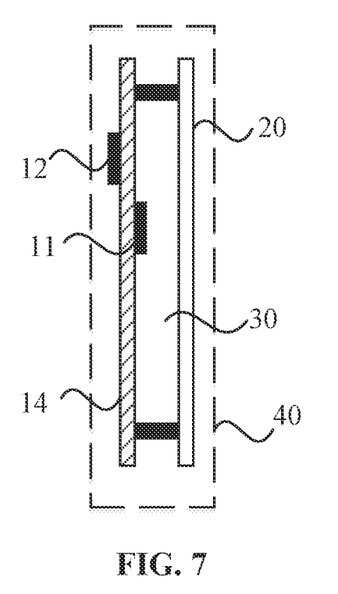
FIG. 7 is a structure diagram of another electrochromic glass according to embodiment seven of the present disclosure.
Figure 8:
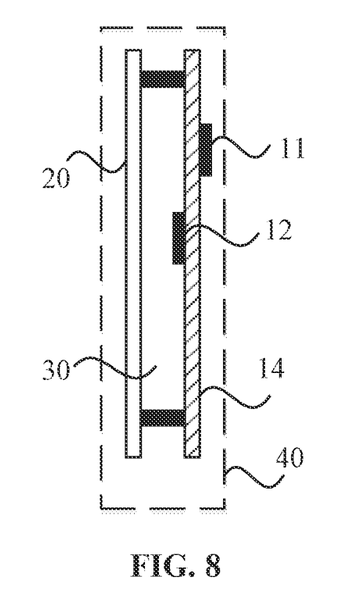
FIG. 8 is a structure diagram of an alternative embodiment of another electrochromic glass according to embodiment seven of the present disclosure.

FIG. 6 is a structure diagram of an electrochromic glass according to embodiment seven of the present disclosure. FIG. 7 is a structure diagram of another electrochromic glass according to embodiment seven of the present disclosure. FIG. 8 is a structure diagram of an alternative embodiment of another electrochromic glass according to embodiment seven of the present disclosure. The electrochromic glass may be insulating glass, and the electrochromic layer includes at least one electrochromic cell whose transmittance is capable of being separately adjusted.

As shown in FIG. 6, the first sensor 11 is disposed at a preset position on the side of the electrochromic layer 14 facing the incidence of the ambient light, and the second sensor 12 is disposed at a preset position on the side of the electrochromic layer 14 facing away from the incidence of the ambient light. The second sensor 12 may be disposed in close contact with the electrochromic layer 14 or may be disposed at a position where light intensity requires to be detected. Exemplarily, the second sensor 12 is disposed on a table top of a conference table. The electrochromic glass 10 includes the electrochromic layer 14, which may be a flexible or rigid sheet layer with the adjustable transmittance and made of one layer of material or a combination of multiple layers of materials, including types such as PDLC glass, an SPD and EC glass. The detailed structural characteristics of this part are within the understanding of those skilled in the art and are not repeated here.

As shown in FIG. 7, in an embodiment, the electrochromic glass 10 may be an insulating glass 40 and further includes an ordinary glass layer 20, where an insulating layer 30 of the insulating glass 40 is formed between the ordinary glass layer 20 and an electrochromic layer 14, and the electrochromic layer 14 and the ordinary glass layer 20 are correspondingly disposed to constitute the double-layer insulating glass 40. As shown in FIG. 7, the ordinary glass layer 20 is disposed at a side of the electrochromic layer 14 facing the incidence of ambient light, a first sensor 11 may be disposed inside the insulating layer 30, and a second sensor 12 may be disposed at a preset position on a side of the electrochromic layer 14 facing away from the incidence of the ambient light. The second sensor 12 may be disposed in close contact with the side of the electrochromic layer 14 facing away from the incidence of the ambient tight or may be disposed at a position where light intensity requires to be detected. The electrochromic layer 14 is disposed on a side of the ordinary glass layer 20 adjacent to the insulating layer 30, and an outer ordinary glass layer 20 can protect an electronic component on the electrochromic glass 10. In an alternative embodiment, the first sensor 11 may be disposed in close contact with a side of the ordinary glass layer 20 facing away from the insulating layer 30 or may be disposed at a preset position in the exterior space. For example, the preset position in the exterior space may be on a frame structure close to the electrochromic glass.

As shown in FIG. 8, in an alternative embodiment, when the ordinary glass layer 20 is disposed on the side of the electrochromic layer 14 facing away from the incidence of the ambient light, that is, the electrochromic layer 14 gets close to the ambient space, the second sensor 12 may be disposed inside the insulating layer 30, and the first sensor 11 may be disposed at a preset position on the side of the electrochromic layer 14 facing the incidence of the ambient light. The first sensor 11 may be disposed in close contact with the side of the electrochromic layer 14 facing the incidence of the ambient light or may be disposed at another position. In an alternative embodiment, the second sensor 12 may be disposed in close contact with an inner side of the ordinary glass layer 20 or may be disposed at a preset position of the interior space. For example, the preset position in the interior space may be on an indoor conference table.

Figure 9:
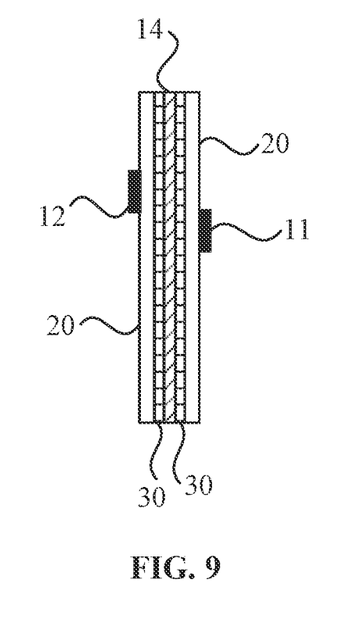
FIG. 9 is a structure diagram of another electrochromic glass according to embodiment seven of the present disclosure.

FIG. 9 is a structure diagram of another electrochromic glass according to embodiment seven of the present disclosure. The electrochromic glass may be laminated glass. As shown in FIG. 9, the laminated glass is composite glass formed by sandwiching two organic polymer intermediate films 30 and one electrochromic layer 14 between two ordinary glass layers 20. Common intermediate films of the laminated glass include polyvinyl butyral (PVB), a Sentry (gas Plus (SGP) ionic intermediate film, an ethylene-vinyl acetate (EVA) copolymer, polyurethane (PU) and the like. A second sensor 12 is disposed on an indoor side, that is, an outer surface of one of the two ordinary glass layers 20 facing away from the incidence of ambient light, and a first sensor 11 is disposed on an outdoor side, that is, an outer surface of the other one of the two ordinary glass layers 20 facing the incidence of the ambient light. In an alternative embodiment, the second sensor 12 may also be disposed between the electrochromic layer 14 and the ordinary glass layer 20, for example, disposed in the organic polymer intermediate film 30, between the electrochromic layer 14 and the organic polymer intermediate film 30, between the ordinary glass layer 20 and the organic polymer intermediate film 30 or the like; and the first sensor 11 may also be disposed between the electrochromic layer 14 and the ordinary glass layer 20, for example, disposed in the organic polymer intermediate film 30, between the electrochromic layer 14 and the organic polymer intermediate film 30, between the ordinary glass layer 20 and the organic polymer intermediate film 30 or the like.

Even if the laminated glass is crushed by an impact, fragments of the laminated glass, as a safety glass, will be adhered to the thin film due to the adhesion of the intermediate film, and a surface of the crushed glass still remains clean and smooth, thereby effectively preventing the fragments from the occurrence of pricking and falling accident due to penetrating, and thus ensuring the personal safety. Moreover, the intermediate film of the laminated glass has the performance of voice insulating and sunlight controlling. Therefore, the laminated glass can not only isolate noise but also block ultraviolet and absorb heat in infrared spectrum, having functions of energy saving and environmental protection.

In an embodiment, a manual module is further included. The manual module is connected to the processor module 13 through a signal, and the manual module is configured to manually adjust a transmittance of the electrochromic glass according to the user's personalized requirement.

Embodiment Eight

Figure 10:
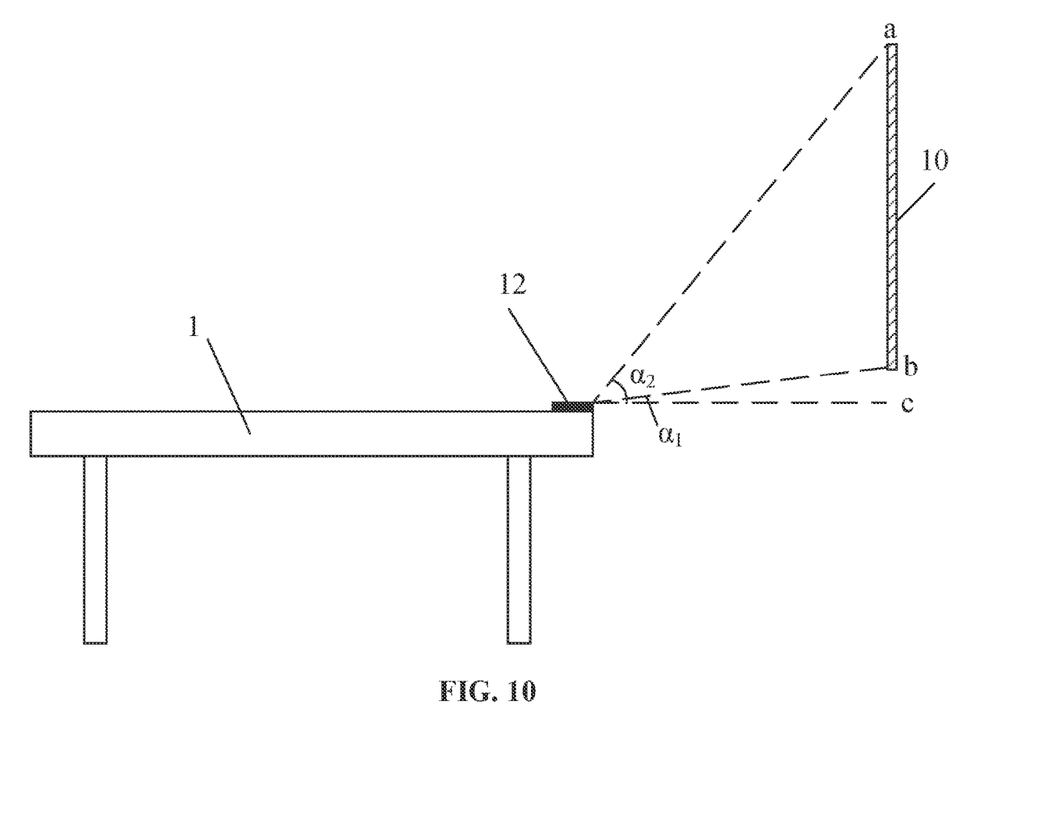
FIG. 10 is a schematic diagram illustrating an application of an electrochromic glass according to embodiment eight of the present disclosure.

FIG. 10 is a schematic diagram illustrating an application of an electrochromic glass according to embodiment eight of the present disclosure. As shown in FIG. 10, a second sensor 12 is disposed at a corresponding position of a table top of an indoor office or conference table 1, and an electrochromic glass 10 is disposed at a distance from the table top of the office or conference table 1. The second sensor 12 can collect light irradiated to the office desk through the electrochromic glass 10 to determine whether the light entering the room reaches the expectation. As shown in FIG. 10, an included angle between dotted lines b and c is $\alpha_1$, and an included angle between dotted lines a and c is $\alpha_2$. An opening angle α of a photosensitive optical path of the second sensor 12 meets: $\alpha_1 < \alpha < \alpha_2$, and all incident light within this angle can be detected by the second sensor 12. The second sensor 12 may be fixed or movable, and the photosensitive optical path of the second sensor 12 is adjusted according to the disposed position, so as to detect the illuminance of light at different positions.

Exemplarity, it is required that within a range of a distance L from a window edge, strong light has no effect on a user. Assuming that a relative height of the glass top to the table top is H and a relative height of the glass bottom to the table top is h, the opening angle of the optical path of the sensor at a corresponding position requires to be set to arctan(h/L) to arctan(H/L). The transmittance of the electrochromic glass connected to the sensor is adjusted, meeting the requirement of no strong light within the range of the distance L from the window edge and a user's requirement for personalizing the electrochromic glass according to different usage scenarios.

What is claimed is:

1. A method for controlling an electrochromic glass, the electrochromic glass comprising an electrochromic layer and a processor module, and the method for controlling the electrochromic glass being performed by the processor module and comprising:
   generating an adjustment instruction based on a second illuminance of ambient light passing through the electrochromic layer, wherein the adjustment instruction carries a control signal; and
   transmitting the adjustment instruction to the electrochromic layer to adjust a transmittance of the electrochromic layer according to the control signal;
   wherein generating the adjustment instruction based on the second illuminance of the ambient light passing through the electrochromic layer comprises: generating the adjustment instruction based on a first illuminance and the second illuminance, wherein the first illuminance is an illuminance of the ambient light not entering the electrochromic layer; and wherein generating the adjustment instruction based on the first illuminance and the second illuminance comprises:

determining a first transmittance to which the transmittance of the electrochromic layer is to be adjusted according to the first illuminance;

determining whether the transmittance of the electrochromic layer is adjusted to the first transmittance;

in response to a determination result that the transmittance of the electrochromic layer is adjusted to the first transmittance, receiving the second illuminance sent by a second sensor configured to detect the second illuminance;

determining whether the second illuminance is within a preset range; and in response to a determination result that the second illuminance is outside of the preset range, generating the adjustment instruction, wherein the adjustment instruction carries a first control signal; wherein when the second illuminance is greater than a maximum value of the preset range, the first control signal is configured to reduce the transmittance of the electrochromic layer; and wherein when the second illuminance is less than a minimum value of the preset range, the first control signal is configured to improve the transmittance of the electrochromic layer.

2. The method for controlling the electrochromic glass according to claim 1, wherein generating the adjustment instruction based on the second illuminance of the ambient light passing through the electrochromic layer comprises:

determining a third transmittance to which the transmittance of the electrochromic layer is to be adjusted according to the second illuminance; and generating the adjustment instruction, wherein the adjustment instruction carries a third control signal configured to adjust the transmittance of the electrochromic layer to the third transmittance.

3. An electrochromic glass, comprising a second sensor, a processor module and an electrochromic layer, wherein:

the second sensor is configured to convert an optical signal to an electrical signal and send the electrical signal to the processor module;

the second sensor is disposed on a side of the electrochromic layer facing away from incidence of ambient light, and a light-sensing surface of the second sensor faces in a direction toward the incidence of the ambient light; and the processor module is configured to implement the method for controlling the electrochromic glass according to claim 2.

4. The method for controlling the electrochromic glass according to claim 1, before generating the adjustment instruction based on the second illuminance of the ambient light passing through the electrochromic layer, further comprising:

determining whether a working time period corresponding to a current time is a preset working time period; and in response to a determination result that the working time period corresponding to the current time is the preset working time period, generating the adjustment instruction based on the second illuminance of the ambient light passing through the electrochromic layer; and in response to a determination result that the working time period corresponding to the current time is outside of the preset working time period, generating an adjustment instruction for adjusting the transmittance of the electrochromic layer to a specified transmittance.

5. An electrochromic glass, comprising a second sensor, a processor module and an electrochromic layer, wherein:

the second sensor is configured to convert an optical signal to an electrical signal and send the electrical signal to the processor module;

the second sensor is disposed on a side of the electrochromic layer facing away from incidence of ambient light, and a light-sensing surface of the second sensor faces in a direction toward the incidence of the ambient light; and the processor module is configured to implement the method for controlling the electrochromic glass according to claim 4.

6. The method for controlling the electrochromic glass according to claim 1, wherein the electrochromic layer comprises at least one electrochromic cell whose transmittance is capable of being separately adjusted, the adjustment instruction further carries a dimming sequence signal, and the adjustment instruction is configured to control the transmittance of the at least one electrochromic cell to be sequentially adjusted according to the dimming sequence signal.

7. An electrochromic glass, comprising a second sensor, a processor module and an electrochromic layer, wherein:

the second sensor is configured to convert an optical signal to an electrical signal and send the electrical signal to the processor module;

the second sensor is disposed on a side of the electrochromic layer facing away from incidence of ambient light, and a light-sensing surface of the second sensor faces in a direction toward the incidence of the ambient light; and the processor module is configured to implement the method for controlling the electrochromic glass according to claim 6.

8. An electrochromic glass, comprising a second sensor, a processor module and an electrochromic layer, wherein:

the second sensor is configured to convert an optical signal to an electrical signal and send the electrical signal to the processor module;

the second sensor is disposed on a side of the electrochromic layer facing away from incidence of ambient light, and a light-sensing surface of the second sensor faces in a direction toward the incidence of the ambient light; and the processor module is configured to implement the method for controlling the electrochromic glass according to claim 1.

9. The electrochromic glass according to claim 8, wherein the electrochromic glass further comprises a first sensor configured to convert an optical signal to an electrical signal and send the electrical signal to the processor module; and wherein the first sensor is disposed on a side of the electrochromic layer facing the incidence of the ambient light, and a light-sensing surface of the first sensor faces in the direction toward the incidence of the ambient light.

10. The electrochromic glass according to claim 8, wherein the electrochromic glass is laminated glass or insulating glass, and the electrochromic layer comprises at least one electrochromic cell whose transmittance is capable of being separately adjusted.

11. A method for controlling an electrochromic glass, the electrochromic glass comprising an electrochromic layer and a processor module, and the method for controlling the electrochromic glass being performed by the processor module and comprising:
generating an adjustment instruction based on a second illuminance of ambient light passing through the electrochromic layer, wherein the adjustment instruction carries a control signal; and
transmitting the adjustment instruction to the electrochromic layer to adjust a transmittance of the electrochromic layer according to the control signal;
wherein generating the adjustment instruction based on the second illuminance of the ambient light passing through the electrochromic layer comprises: generating the adjustment instruction based on a first illuminance and the second illuminance, wherein the first illuminance is an illuminance of the ambient light not entering the electrochromic layer; and
wherein generating the adjustment instruction based on the first illuminance and the second illuminance comprises:
determining a second transmittance to which the transmittance of the electrochromic layer is to be adjusted according to the second illuminance, wherein the second illuminance is detected by a second sensor;
determining whether the second transmittance is lower than a preset transmittance;
in response to a determination result that the second transmittance is lower than the preset transmittance, receiving the first illuminance sent by a first sensor configured to detect the first illuminance;
determining whether the first illuminance is less than a minimum value of a preset range; and
in response to a determination result that the first illuminance is less than the minimum value of the preset range, generating the adjustment instruction, wherein the adjustment instruction carries a second control signal configured to improve the transmittance of the electrochromic layer.

12. An electrochromic glass, comprising a second sensor, a processor module and an electrochromic layer, wherein:
the second sensor is configured to convert an optical signal to an electrical signal and send the electrical signal to the processor module;
the second sensor is disposed on a side of the electrochromic layer facing away from incidence of ambient light, and a light-sensing surface of the second sensor faces in a direction toward the incidence of the ambient light; and
the processor module is configured to implement the method for controlling the electrochromic glass according to claim 11.

13. The electrochromic glass according to claim 12, wherein the electrochromic glass further comprises a first sensor configured to convert an optical signal to an electrical signal and send the electrical signal to the processor module; and wherein the first sensor is disposed on a side of the electrochromic layer facing the incidence of the ambient light, and a light-sensing surface of the first sensor faces in the direction toward the incidence of the ambient light.

14. The electrochromic glass according to claim 12, wherein the electrochromic glass is laminated glass or insulating glass, and the electrochromic layer comprises at least one electrochromic cell whose transmittance is capable of being separately adjusted.

15. The method for controlling the electrochromic glass according to claim 11, wherein generating the adjustment instruction based on the second illuminance of the ambient light passing through the electrochromic layer comprises:
determining a third transmittance to which the transmittance of the electrochromic layer is to be adjusted according to the second illuminance; and
generating the adjustment instruction, wherein the adjustment instruction carries a third control signal configured to adjust the transmittance of the electrochromic layer to the third transmittance.

16. An electrochromic glass, comprising a second sensor, a processor module and an electrochromic layer, wherein:
the second sensor is configured to convert an optical signal to an electrical signal and send the electrical signal to the processor module;
the second sensor is disposed on a side of the electrochromic layer facing away from incidence of ambient light, and a light-sensing surface of the second sensor faces in a direction toward the incidence of the ambient light; and
the processor module is configured to implement the method for controlling the electrochromic glass according to claim 15.

17. The method for controlling the electrochromic glass according to claim 11, before generating the adjustment instruction based on the second illuminance of the ambient light passing through the electrochromic layer, further comprising:
determining whether a working time period corresponding to a current time is a preset working time period; and
in response to a determination result that the working time period corresponding to the current time is the preset working time period, generating the adjustment instruction based on the second illuminance of the ambient light passing through the electrochromic layer; and in response to a determination result that the working time period corresponding to the current time is outside of the preset working time period, generating an adjustment instruction for adjusting the transmittance of the electrochromic layer to a specified transmittance.

18. An electrochromic glass, comprising a second sensor, a processor module and an electrochromic layer, wherein:
the second sensor is configured to convert an optical signal to an electrical signal and send the electrical signal to the processor module;
the second sensor is disposed on a side of the electrochromic layer facing away from incidence of ambient light, and a light-sensing surface of the second sensor faces in a direction toward the incidence of the ambient light; and
the processor module is configured to implement the method for controlling the electrochromic glass according to claim 17.

19. The method for controlling the electrochromic glass according to claim 11, wherein the electrochromic layer comprises at least one electrochromic cell whose transmittance is capable of being separately adjusted, the adjustment instruction further carries a dimming sequence signal, and the adjustment instruction is configured to control the transmittance of the at least one electrochromic cell to be sequentially adjusted according to the dimming sequence signal.

20. An electrochromic glass, comprising a second sensor, a processor module and an electrochromic layer, wherein:

the second sensor is configured to convert an optical signal to an electrical signal and send the electrical signal to the processor module;

the second sensor is disposed on a side of the electrochromic layer facing away from incidence of ambient light, and a light-sensing surface of the second sensor faces in a direction toward the incidence of the ambient light; and the processor module is configured to implement the method for controlling the electrochromic glass according to claim 19.

\* \* \* \* \*